United States Patent
Kobayashi et al.

(10) Patent No.: US 7,911,691 B2
(45) Date of Patent: Mar. 22, 2011

(54) BINOCULARS HAVING DIOPTER ADJUSTMENT

(75) Inventors: Takaharu Kobayashi, Saitama (JP); Takemi Seo, Hong Kong (CN)

(73) Assignee: Fujinon Corporation, Saitama-shi (JP)

( * ) Notice: Subject to any disclaimer, the term of this patent is extended or adjusted under 35 U.S.C. 154(b) by 357 days.

(21) Appl. No.: 12/155,508

(22) Filed: Jun. 5, 2008

(65) Prior Publication Data
US 2008/0304148 A1    Dec. 11, 2008

(30) Foreign Application Priority Data

Jun. 7, 2007  (JP) ................................ 2007-151118

(51) Int. Cl.
*G02B 23/00*   (2006.01)
(52) U.S. Cl. ................... 359/425; 359/407; 359/410
(58) Field of Classification Search .......... 359/399–432, 359/480–482
See application file for complete search history.

(56) References Cited

U.S. PATENT DOCUMENTS

| | | | |
|---|---|---|---|
| 5,064,279 A | 11/1991 | Riedl | |
| 6,335,825 B1 * | 1/2002 | Funatsu | 359/412 |
| 7,330,310 B2 * | 2/2008 | Hengst et al. | 359/418 |
| 2005/0122581 A1 * | 6/2005 | Luthardt et al. | 359/410 |
| 2006/0033990 A1 * | 2/2006 | Kato et al. | 359/425 |

FOREIGN PATENT DOCUMENTS

| | | |
|---|---|---|
| JP | 3-163512 A | 7/1991 |
| JP | 2000-56205 A | 2/2000 |

* cited by examiner

*Primary Examiner* — Thong Nguyen
(74) *Attorney, Agent, or Firm* — Birch, Stewart, Kolasch & Birch, LLP

(57) ABSTRACT

Binoculars include first and second lens barrels. A bridge interconnects the lens barrels. First and second optical systems are accommodated in respectively the lens barrels. First and second focus lenses are included in respectively the first and second optical systems, for focus adjustment by moving in an optical axis direction. An operation barrel is secured to the bridge, and externally rotatable and movable in the optical axis direction between a focus adjusting position and a diopter adjusting position. A focus adjuster with gear teeth and screw threads moves the first and second focus lenses simultaneously in the optical axis direction when the operation barrel is rotated in the focus adjusting position. A diopter adjuster, including gear teeth, an intermediate rod and screw threads, moves the second focus lens in the optical axis direction when the operation barrel is rotated in the diopter adjusting position.

10 Claims, 5 Drawing Sheets

BINOCULARS HAVING DIOPTER ADJUSTMENT

BACKGROUND OF THE INVENTION

1. Field of the Invention

The present invention relates to binoculars having diopter adjustment. More particularly, the present invention relates to binoculars in which a mechanism for a diopter adjustment is simply constructed with high operability in addition to a mechanism for focus adjustment.

2. Description Related to the Prior Art

Binoculars as an optical instrument include right and left side optical systems for eyes of a user to view a scene. Each of the right and left side optical systems includes objective lens optics and ocular lens optics. Various methods of adjusting the focusing of the binoculars are known in the optical field. For example, the individual focusing (IF) method is known in which a focus adjusting ring is associated with each of the right and left side optical systems, and is rotated for focus adjustment of the right and left side optical systems in a discrete manner. Also, the central focusing (CF) method is known in which a single focus adjusting ring is used commonly for the right and left side optical systems, and is rotated for focusing of the right and left side optical systems simultaneously in a linked manner. In any of the focus adjusting methods, a focus lens/lens group included in each of the right and left side optical systems is moved on an optical axis for the purpose of focusing.

If a user has a difference in sight between his or her eyes, it is necessary in the right and left side optical systems to focus an image at both of the eyes. It is possible in the IF method of the binoculars to adjust the right and left side optical systems suitably in view of the difference in sight, because of the separate focusing. However, the binoculars of the CF method is provided with a diopter adjusting ring according to requirement in addition to the focus adjusting ring which adjusts focusing of the right and left side optical systems simultaneously. The diopter adjusting ring moves a first optical system of the right and left side optical systems on the optical axis in an independent manner from a second optical system. At first in the operation, the focus adjusting ring in the binoculars of the CF method is rotated to focus the first optical system. Then the diopter adjusting ring is operated to adjust the second optical system for focusing in an equal manner.

U.S. Pat. No. 5,064,279 (corresponding to JP-A 3-163512) and JP-A 2000-056205 disclose examples in which the diopter adjusting ring is disposed about one of eye cups on the right side, or disposed together with the focus adjusting ring in a coaxial manner with a bridge or hinge mechanism between lens barrels of the right and left side optical systems. In the first type of those, one of the eye cups is shifted by operation of the diopter adjusting ring to move the ocular lens optics back or forth. However, there is a shortcoming in that a difference occurs between protruding amounts of the eye cups owing to the shift.

In the binoculars of the CF method, the focus adjusting ring and the diopter adjusting ring separate from the focus adjusting ring are disposed in association with the right and left side optical systems. Rotational operation for those is not simple, so that operability in the adjustment is somewhat low. If a user wishes to effect the focus adjustment and then the diopter adjustment, he or she must move a finger away from the focus adjusting ring and set it on the diopter adjusting ring. It is likely that the diopter adjusting ring is inadvertently rotated by the finger of a typically unskilled user. He or she must move the eyes away from the ocular lens optics before the diopter adjusting ring can be visually checked. However, an object to be observed through the binoculars may be missed in the scene in the diopter adjustment. It is difficult to frame such an object in the exactly same manner even by targeting again.

Although the diopter adjustment is not required in normal use of the binoculars, it is likely that an erroneous shift of the diopter adjusting ring occurs in a manual operation of the binoculars, to require readjustment of the diopter. JP-A 2000-056205 discloses an idea for preventing errors in operating the diopter adjusting ring. Claws and grooves are used for engagement and retention in a readily releasable manner for the diopter adjusting ring. However, the retention of the diopter adjusting ring according to the document is insufficient for reliably preventing errors in the operation.

SUMMARY OF THE INVENTION

In view of the foregoing problems, an object of the present invention is to provide binoculars in which a mechanism for a diopter adjustment is simply constructed with high operability in addition to a mechanism for focus adjustment.

In order to achieve the above and other objects and advantages of this invention, binoculars include first and second lens barrels, a bridge for interconnecting the first and second lens barrels, and first and second optical systems accommodated in respectively the first and second lens barrels. The binoculars include first and second focus lenses, included in respectively the first and second optical systems, and movable in an optical axis direction. An operation device is secured to the bridge, movable in the optical axis direction between a focus adjusting position and a diopter adjusting position, and rotatable in each of the focus adjusting position and the diopter adjusting position. A focus adjuster moves the first and second focus lenses simultaneously in the optical axis direction for focus adjustment when the operation device is rotated in the focus adjusting position. A diopter adjuster moves the second focus lens in the optical axis direction for diopter adjustment when the operation device is rotated in the diopter adjusting position.

Furthermore, a changeover mechanism connects the operation device to one of the focus adjuster and the diopter adjuster selectively. The changeover mechanism transmits rotation of the operation device to the focus adjuster when the operation device is in the focus adjusting position, and transmits rotation of the operation device to the diopter adjuster when the operation device is in the diopter adjusting position.

Specifically, the operation device includes a double barrel structure having a barrel body and a middle sleeve portion, the barrel body being operated externally for focus adjustment and diopter adjustment, the middle sleeve portion receiving insertion of a support shaft of the bridge in a rotatable and movable manner. A first gear is formed inside the barrel body, for transmitting rotation of the double barrel structure to the focus adjuster when the double barrel structure is set in the focus adjusting position. A second gear is formed inside the barrel body, offset from the first gear with an interval, for transmitting rotation of the double barrel structure to the diopter adjuster when the double barrel structure is set in the diopter adjusting position.

The focus adjuster includes a sleeve-shaped transmission wheel for receiving insertion of the middle sleeve portion rotatably, having a male thread and a focus adjusting gear, the male thread being formed with an outer wheel surface, the focus adjusting gear being engageable with the first gear in mesh. A movable ring is helically engaged with the male thread, for moving in the optical axis direction when the sleeve-shaped transmission wheel is rotated by the double barrel structure. First and second lens holders support respectively the first and second focus lenses. A first connection device connects the first lens holder with the movable ring, and moves the first lens holder in the optical axis direction upon movement of the movable ring. A second connection device connects the second lens holder with the movable ring, moves the second lens holder in the optical axis direction upon movement of the movable ring, and elongates and shortens in the optical axis direction upon rotating.

The diopter adjuster includes a transmission gear engageable with the second gear in mesh. A diopter adjusting gear is meshed with the transmission gear, secured to the second connection device, for rotating to elongate or shorten the second connection device, so as to move the second focus lens in the optical axis direction.

The transmission gear is disposed to extend in the optical axis direction for maintaining a meshed state irrespective of movement of the diopter adjusting gear in the optical axis direction during focus adjustment.

The second connection device includes a lens holder rod secured to the second lens holder fixedly. A rotatable intermediate rod is helically engaged with the lens holder rod, and has the diopter adjusting gear secured thereto.

Furthermore, a retention mechanism positions and retains the operation device in the focus adjusting position or the diopter adjusting position.

The operation barrel is located on an ocular side from the bridge.

The diopter adjusting position is located on an ocular side from the focus adjusting position.

The support shaft of the bridge supports the first and second lens barrels rotatably for interpupillary distance adjustment.

Also, binoculars include first and second lens barrels, a bridge for interconnecting the first and second lens barrels, and first and second optical systems accommodated in respectively the first and second lens barrels. The binoculars include first and second focus lenses, included in respectively the first and second optical systems, for focus adjustment by moving in an optical axis direction. An externally operable operation device is secured to the bridge, and rotatable and movable in the optical axis direction between a focus adjusting position and a diopter adjusting position. A focus adjuster moves the first and second focus lenses simultaneously in the optical axis direction when the operation device is rotated in the focus adjusting position. A diopter adjuster moves the second focus lens in the optical axis direction when the operation device is rotated in the diopter adjusting position. Furthermore, first and second connection devices are secured to respectively lens holders of the first and second focus lenses, shifted by the focus adjuster, for moving the first and second focus lenses in the optical axis direction. The diopter adjuster includes a shifting mechanism, incorporated in the second connection device, for shifting the second connection device upon rotation thereof, to move back or forth the second focus lens in the optical axis direction.

The second connection device includes an intermediate rod for being rotated by the second gear. The shifting mechanism is disposed between the intermediate rod and the lens holder of the second focus lens, and moves the lens holder in the optical axis direction when the intermediate rod is rotated.

Furthermore, a rotational shaft portion is disposed between the diopter adjusting gear and the intermediate rod, and has a smaller diameter than the diopter adjusting gear and the intermediate rod. A recess is formed in the movable ring, for receiving insertion of the rotational shaft portion, and keeping the rotational shaft portion rotatable, to prevent the diopter adjusting gear and the intermediate rod from sliding with respect to the movable ring.

The focus adjuster includes a focus adjusting gear is rotated by the first gear in mesh therewith. An intermediate barrel is formed to project from the focus adjusting gear, and inserted in the movable ring. A thread mechanism is disposed between the intermediate barrel and the movable ring, for moving back or forth the movable ring relative to the intermediate barrel when the focus adjusting gear is rotated.

The operation barrel includes an end opening formed in a portion opposed to the bridge. A cover panel closes the end opening. First and second insertion holes are formed in the cover panel, for receiving insertion of respectively the first and second connection devices, to keep the first and second connection devices slidable.

Consequently, the mechanism for a diopter adjustment is simply constructed with high operability in addition to a mechanism for focus adjustment, because the operation device at the bridge is rotatable and also movable for the purpose of the focus adjustment and diopter adjustment.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
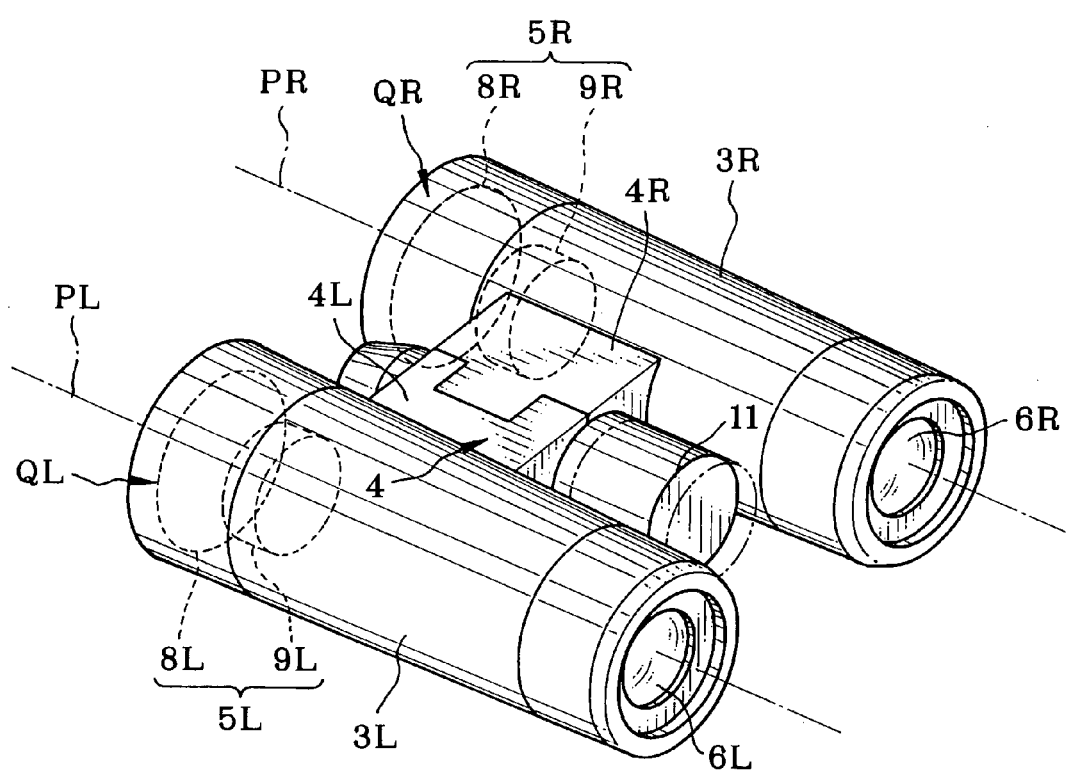
FIG. 1 is a perspective view illustrating binoculars of the invention.
Figure 2:
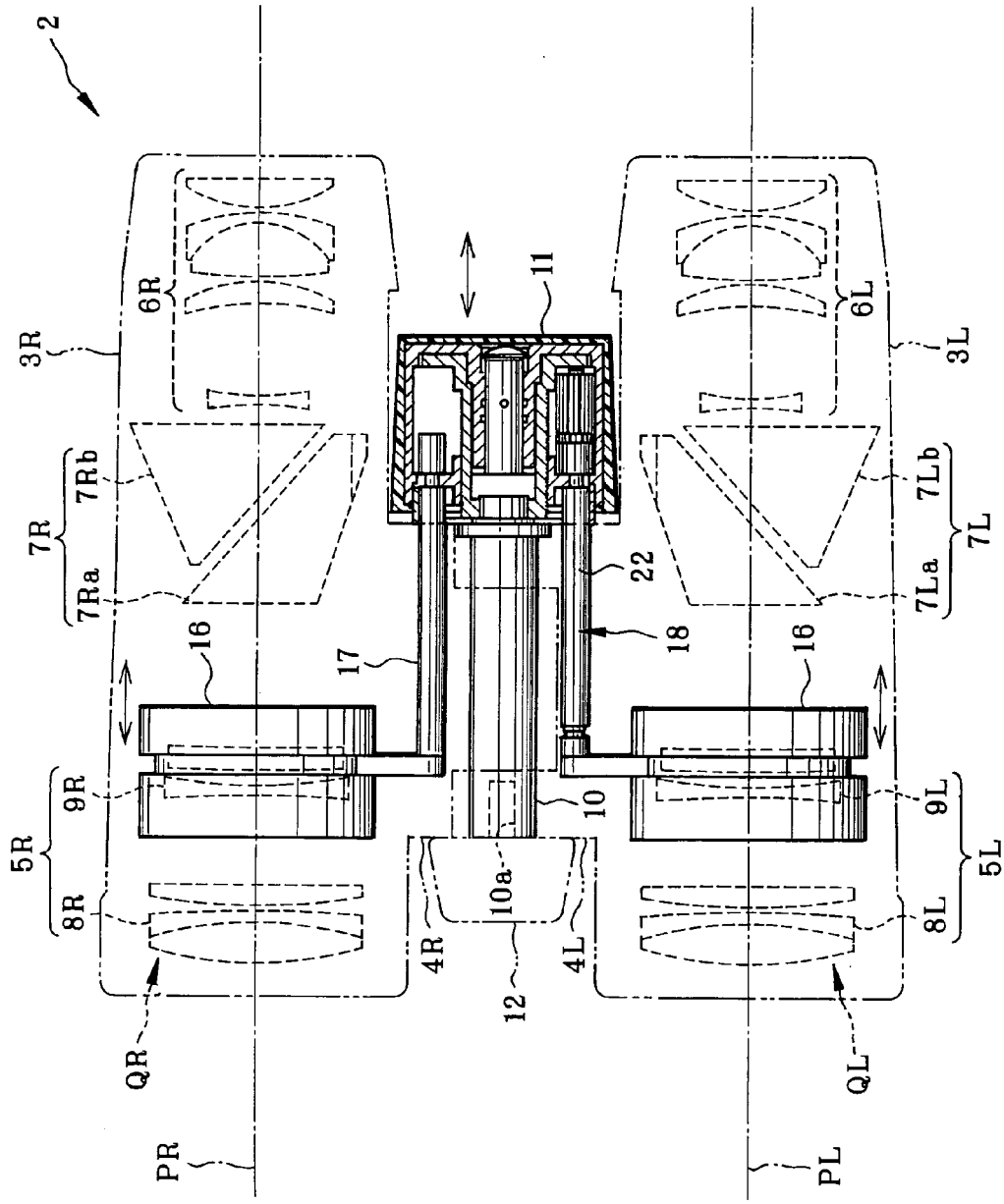
FIG. 2 is a horizontal section illustrating binoculars.

In FIGS. 1 and 2, binoculars 2 of the present invention are illustrated. A pair of lens barrels 3R and 3L are combined in the binoculars 2. A bridge 4 mechanically connects the lens barrels 3R and 3L with one another. A right side optical system QR is accommodated in the lens barrel 3R. A left side optical system QL is accommodated in the lens barrel 3L. A binocular optical system is defined by a combination of the right and left side optical systems QR and QL, of which optical axes PR and PL are parallel with one another.

The right side optical system QR includes objective lens optics 5R, ocular lens optics 6R, and a prism group 7R. The objective lens optics 5R include a stationary lens 8R and a focus lens 9R. Each of the ocular lens optics 6R, the stationary lens 8R and the focus lens 9R is constituted by a plurality of lens elements, but may be constituted by a single lens element. The prism group 7R includes roof prisms 7Ra and 7Rb. A light path between the objective and ocular lens optics 5R and 6R is bent by the prism group 7R. In contrast, an optical path of the objective and ocular lens optics 5R and 6R is straight. The binoculars 2 are a roof prism type called in the field of binoculars.

The left side optical system QL similarly includes objective lens optics 5L, ocular lens optics 6L and a prism group 7L. The objective lens optics 5L include a stationary lens 8L and a focus lens 9L. The prism group 7L includes roof prisms 7La and 7Lb.

The focus lenses 9R and 9L are movable on the optical axes PR and PL of the optical systems QR and QL. The focusing of the right side optical system QR is adjusted by moving the focus lens 9R. The focusing of the left side optical system QL is adjusted by moving the focus lens 9L. When the focus lenses 9R and 9L are moved at an equal amount simultaneously, the focusing of the binoculars 2 is adjusted. When only the focus lens 9L is moved, the diopter of the binoculars 2 is adjusted.

Note that the focus lens 9R may be moved in place of the focus lens 9L for the purpose of the diopter adjustment. Various known structures of optics known in the art can be used in the invention. For example, prisms in the optical system may be Porro prisms or the like in place of the roof prisms. A lens/lens group in the ocular lens optics may be moved as focus lens for the focus adjustment and diopter adjustment. The focus lens of a preferable example can be a lens/lens group movable inside a lens barrel. It is possible to set a projecting size equal between the right and left eye cups even in the structure where the focus lens in ocular lens optics is movable in a lens barrel.

The bridge 4 includes a pair of hinge portions 4R and 4L and a support shaft 10 extending in parallel with the optical axis for interpupillary adjustment. The hinge portion 4R protrudes from the lens barrel 3R. The hinge portion 4L protrudes from the lens barrel 3L. The hinge portions 4R and 4L are mounted on the support shaft 10 in a rotatable manner. The lens barrels 3R and 3L are pivotally movable in a predetermined angular range about the support shaft 10. A distance between eye cups or the ocular lens optics 6R and 6L can be adjusted according to the well-known interpupillary distance adjustment for eyes of a user. Note that only the lens barrel 3R is rotatable about the support shaft 10 specifically according to the embodiment.

An operation barrel 11 or operation ring is disposed at an end face of the bridge 4 on the ocular side for focus adjustment and diopter adjustment and shiftable for changeover. The operation barrel 11 is rotatable about a center which is defined at the support shaft 10. Also, the operation barrel 11 is shiftable between a focus adjusting position and a diopter adjusting position. The focus adjusting position is indicated by the solid line in FIG. 1. The diopter adjusting position is indicated by the phantom line, and defined on the ocular side as viewed from the focus adjusting position in parallel with the optical axes PR or PL.

A screw hole 10a is formed in an end face of the support shaft 10 positioned opposite to the operation barrel 11. When a user wishes to mount the binoculars 2 on a tripod or other external support, the screw hole 10a is used for connection with an adapter suitable for the tripod. A cap 12 closes the screw hole 10a in a removable manner.

Figure 3:
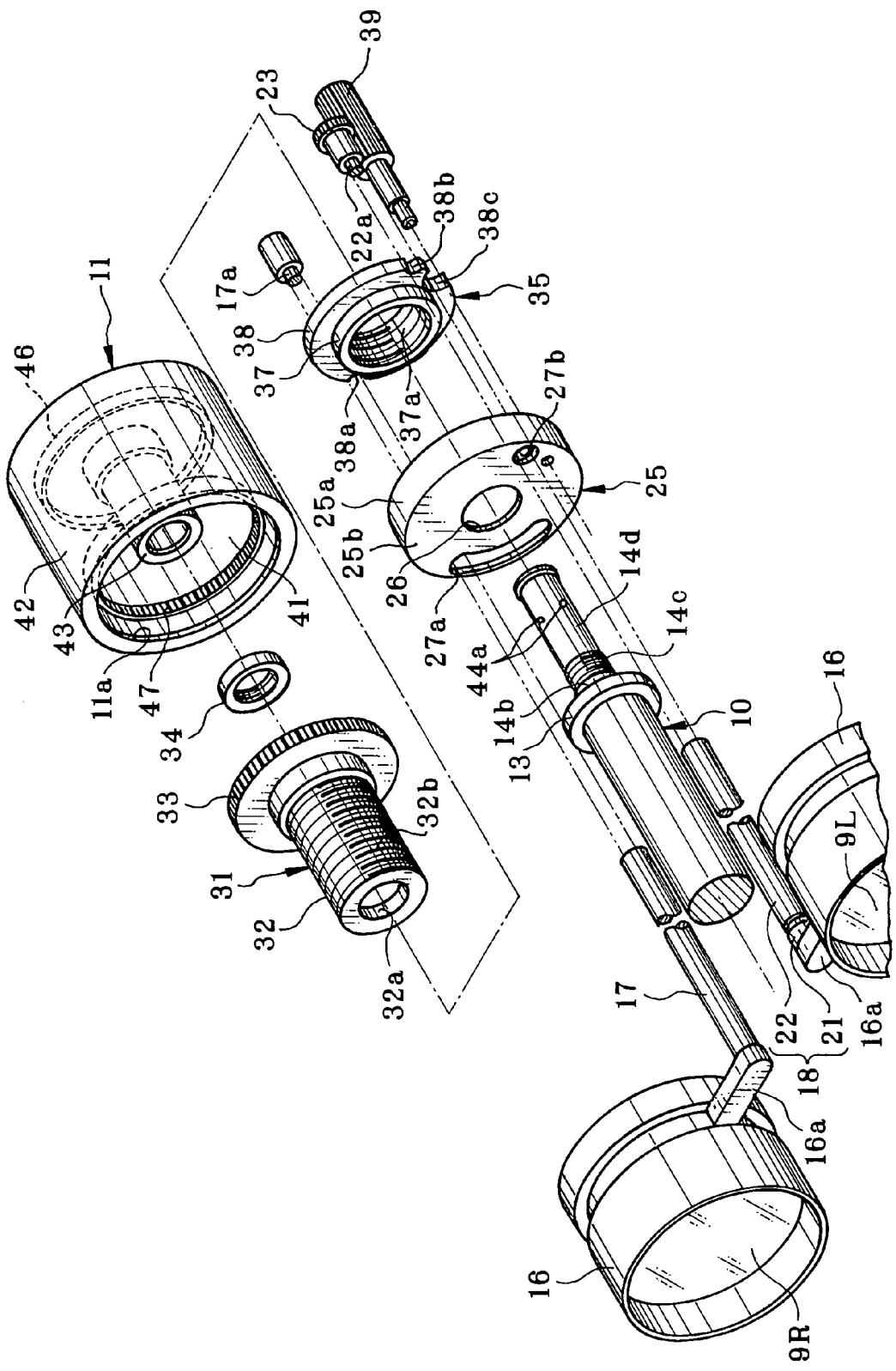
FIG. 3 is an exploded perspective view illustrating mechanical elements in the binoculars for focus adjustment and diopter adjustment.
Figure 4:
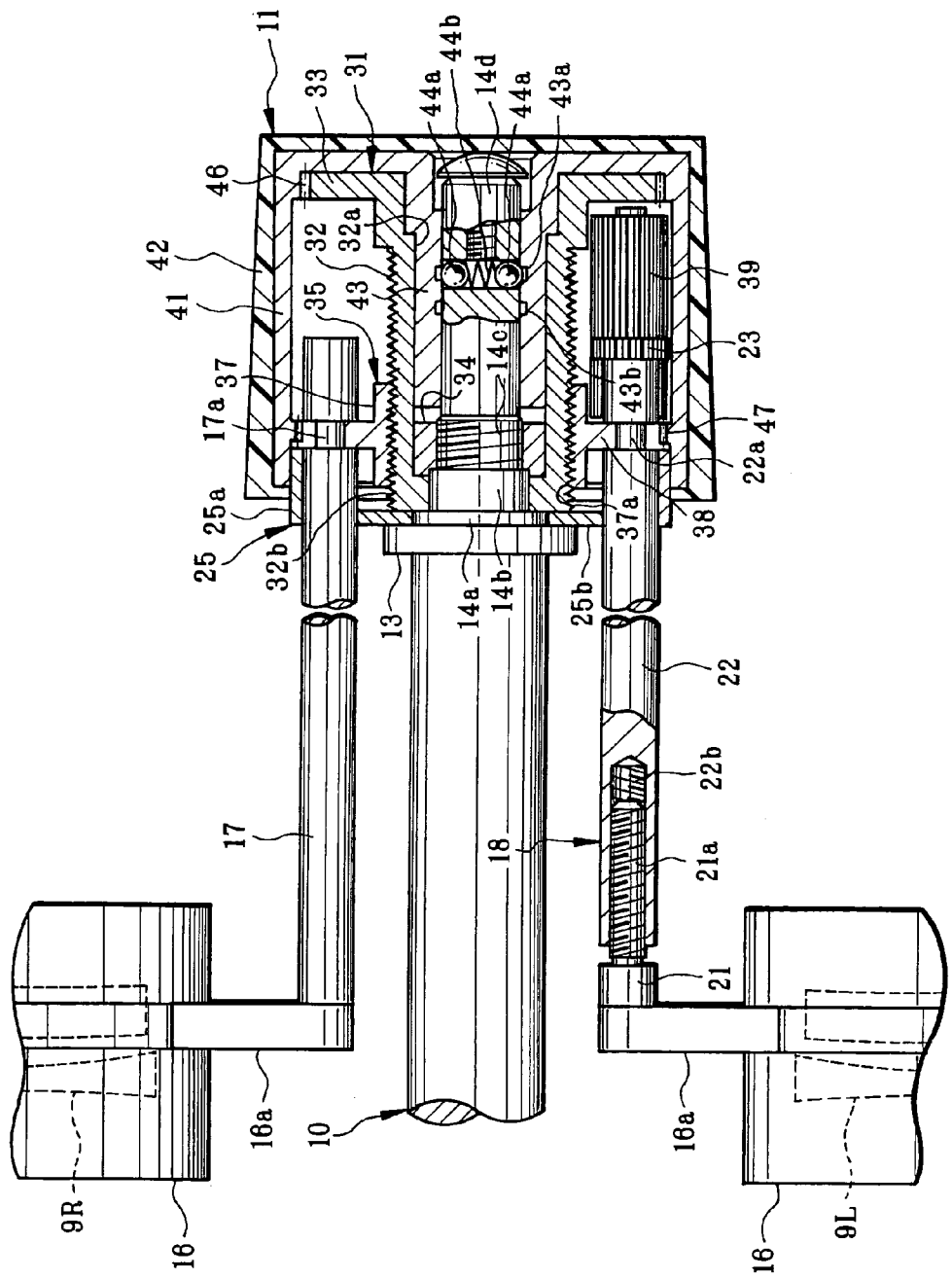
FIG. 4 is a horizontal section illustrating a state of the mechanical elements where an operation barrel is in a focus adjusting position.
Figure 5:
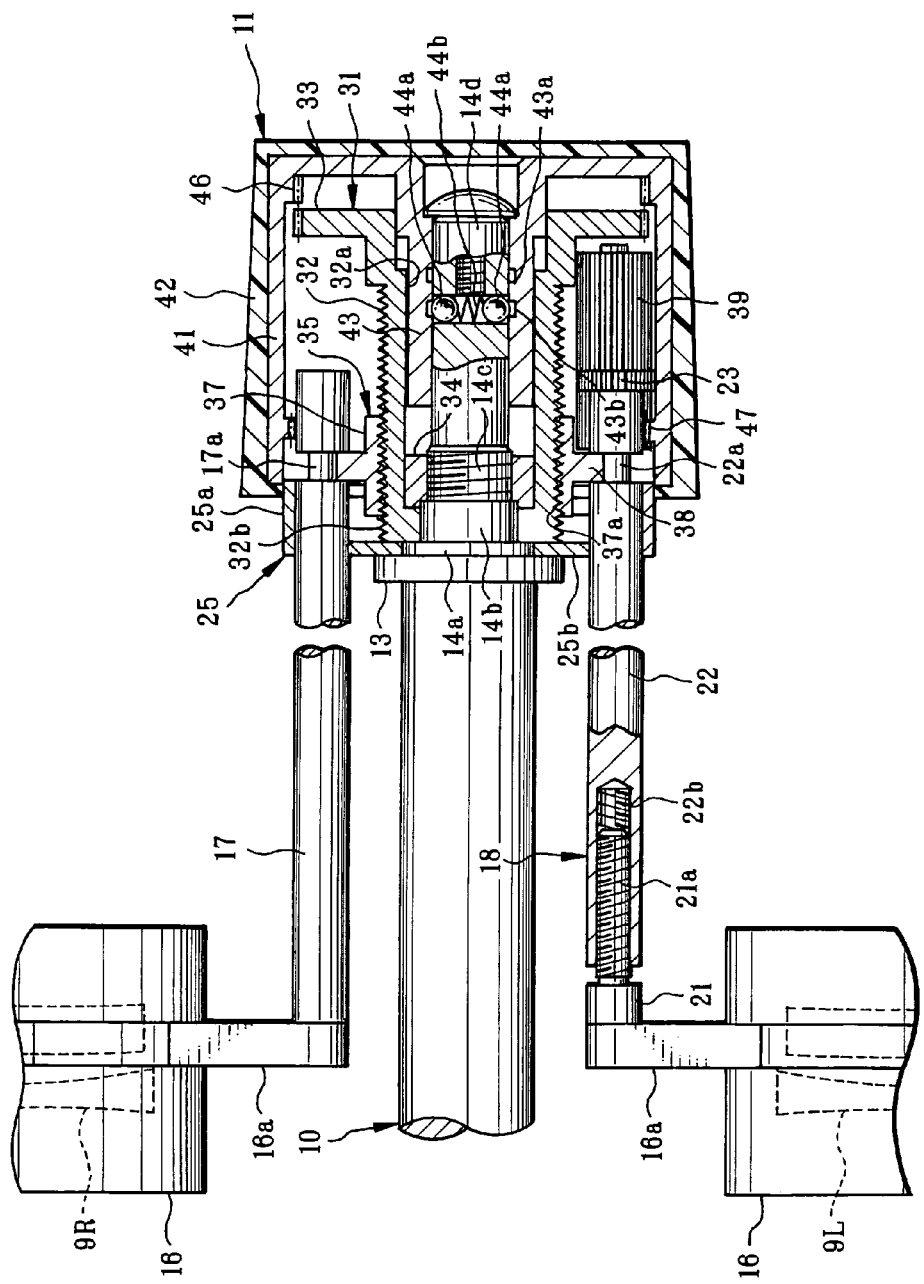
FIG. 5 is a horizontal section illustrating a state of the mechanical elements where the operation barrel is in a diopter adjusting position.

In FIG. 4, the operation barrel 11 is in the focus adjusting position. In FIG. 5, the operation barrel 11 is in the diopter adjusting position. In FIGS. 3-5, a flange 13 is formed in the middle portion of the support shaft 10. The hinge portions 4R and 4L are supported on the support shaft 10 on the objective side from the flange 13, and cooperate for the interpupillary distance adjustment according to the distance between a user's eyes. Shaft portions 14a, 14b, 14c and 14d are included in the support shaft 10 and positioned on the ocular side from the flange 13. The shaft portions 14a-14d have diameters decreasing in the sequence. Various mechanical elements are mounted on the shaft portions 14a-14d, including the operation barrel 11, focus adjuster, diopter adjuster, and changeover mechanism.

There are lens holders 16 with which the focus lenses 9R and 9L are respectively supported. The lens holders 16 are cylindrical, are contained in the lens barrels 3R and 3L, have an outer diameter which is substantially equal to their inner diameter, and are kept movable on the optical axes PR and PL. An arm 16a projects from each of the lens holders 16 and extends toward the support shaft 10.

A first rod-shaped connection device 17 on the right side is disposed to move the focus lens 9R as focus adjuster. The first connection device 17 is a rod of a constant length. A front end of the first connection device 17 is secured to the arm 16a at the focus lens 9R. A rear end of the first connection device 17 has a rotational shaft portion 17a defined by a groove and with a smaller diameter of the first connection device 17. When the first connection device 17 is slid in parallel with the optical axis PR, the focus lens 9R is slid together.

There is a second rod-shaped connection device 18 for moving the focus lens 9L or second focus lens. The second connection device 18 includes a lens holder rod 21 and an intermediate rod 22. A front end of the lens holder rod 21 is firmly secured to the arm 16a of the focus lens 9R. A rear end of the lens holder rod 21 has a male thread 21a. A rotational shaft portion 22a defined by a groove is formed in the intermediate rod 22 with a reduced diameter. A diopter adjusting gear 23 is formed with the intermediate rod 22. A female thread 22b of the intermediate rod 22 is meshed with the male thread 21a of the lens holder rod 21, so that the intermediate rod 22 is combined with the lens holder rod 21 in a manner of a single rod. The male and female threads 21a and 22b cooperate helically as shifting mechanism for shift of the focus lens 9L in a diopter adjuster.

The second rod-shaped connection device 18 is firmly secured to the lens holder 16 in the lens barrel 3L, and does not rotate about the support shaft 10. As the lens holder rod 21 is fastened on the lens holder 16, rotation of the intermediate rod 22 causes the shifting mechanism on the lens holder rod 21 to change the rod length of the second connection device 18. When the entirety of the second connection device 18 moves in the optical axis direction PL, the focus lens 9L moves together with the second connection device 18. Also, rotation of the intermediate rod 22 causes the focus lens 9L to move in the optical axis direction PL.

Note that a shifting mechanism for moving the focus lens 9L back and forth may be constructed differently from the example including the lens holder rod 21 and the intermediate rod 22. For example, one connection rod may have one end formed with the diopter adjusting gear 23. A second end of the connection rod may have a male thread. A screw hole with a female thread may be formed in the arm 16a, so that the male thread is engaged with the female thread. When the connection rod is rotated, the lens holder 16 can be moved back and forth in the optical axis direction.

An end opening 11a is formed in a front face of the operation barrel 11 opposed to the bridge 4. A cover panel 25 closes the end opening 11a to protect elements inside the operation barrel 11. The cover panel 25 includes a disk 25b and a ring-shaped flange 25a. The ring-shaped flange 25a projects radially from the disk 25b, and has a diameter equal to or smaller than the diameter of the end opening 11a of the operation barrel 11. The ring-shaped flange 25a projects into the end opening 11a at a slightly greater amount than an amount of slide of the operation barrel 11 between the focus adjusting position and diopter adjusting position. Even when the operation barrel 11 is shifted backwards to the diopter adjusting position, the inner elements of the operation barrel 11 are kept contained inside the ring-shaped flange 25a.

A connection hole 26 is formed at the center of the disk 25b. The cover panel 25 is fixed to the support shaft 10 by fitting the shaft portion 14a in the connection hole 26. Also, an insertion slot 27a is formed in the disk 25b for insertion of the first rod-shaped connection device 17. An insertion hole 27b is formed in the disk 25b for insertion of the intermediate rod 22 of the second connection device 18. The insertion slot 27a has an arc shape defined about the support shaft 10, and has a length sufficient for rotational movement of the first connection device 17 together with the lens barrel 3R. The insertion hole 27b has a circular shape with a diameter equal to or greater than that of the intermediate rod 22.

A rotatable transmission wheel 31 in the focus adjuster rotates for the purpose of focus adjustment. The transmission wheel 31 includes an intermediate barrel 32 and a focus adjusting gear 33 formed with the intermediate barrel 32 on the ocular side. The support shaft 10 is inserted in an inner space 32a of the intermediate barrel 32 in the transmission wheel 31. Thus, the transmission wheel 31 is supported on the shaft portion 14b rotatably about the axis in parallel with the optical axes PR and PL. A male thread 32b is formed about the intermediate barrel 32 as the thread mechanism for shift in the optical axis direction.

A hole at a front end of the inner space 32a has an inner diameter equal to an outer diameter of the shaft portion 14b on the objective side. Remaining portions of the inner space 32a have an inner diameter greater than the outer diameter of the shaft portion 14b. A ring nut 34 having a female thread is set on the support shaft 10 by insertion, and is helically engaged with the male thread of the shaft portion 14c. The projecting end of the intermediate barrel 32 disposed about the shaft portion 14b is positioned between the ring nut 34 and the shaft portion 14a, so as to keep the transmission wheel 31 rotatable and prevent the transmission wheel 31 from offsetting axially along the support shaft 10. Note that bearings, washers or other additional elements can be disposed between the shaft portion 14a, the intermediate barrel 32 and the ring nut 34. Also, grease or other lubricant may be applied to such additional elements to smooth the rotation of the transmission wheel 31.

A shifting barrel 35 cooperates with the rod-shaped connection devices 17 and 18 and the transmission wheel 31, and moves the focus lenses 9R and 9L simultaneously for focus adjustment. The shifting barrel 35 includes a movable ring 37 and a flange 38 formed about the movable ring 37. A female thread 37a in the thread mechanism for shift is formed inside the movable ring 37 as focus adjuster. The shifting barrel 35 is set about the intermediate barrel 32 by helically engaging the female thread 37a with the male thread 32b of the intermediate barrel 32.

Recesses 38a, 38b and 38c are formed in the flange 38 on the movable ring 37. The recess 38a receives insertion of the first rod-shaped connection device 17 at the rotational shaft portion 17a for supporting the first connection device 17 on the flange 38. The recess 38b receives insertion of the second connection device 18 at the rotational shaft portion 22a for supporting the second connection device 18 on the flange 38.

The recess 38a is formed in the direction along an arc of the flange 38, and allows the first rod-shaped connection device 17 to rotate about the support shaft 10 in an engaged state. The recess 38b is formed in a sector shape, has a width substantially equal to that of the rotational shaft portion 22a, and allows the second connection device 18 to rotate about its axis. The recess 38c is formed to prevent interference of a transmission gear 39 with the flange 38 moving in parallel with the optical axes PR and PL. A width of the portion of the recess 38c for passing the transmission gear 39 is greater than that of the transmission gear 39.

As the second rod-shaped connection device 18 is engaged with the flange 38 and is prevented from rotating about the support shaft 10, the shifting barrel 35 is prevented from rotating about the support shaft 10. Therefore, the shifting barrel 35 moves in parallel with the optical axes PR and PL with the connection devices 17 and 18 when the intermediate barrel 32 rotates, because of helical coupling of the male and female threads 32b and 37a.

As viewed in parallel with the optical axes PR and PL, a size of the rotational shaft portions 17a and 22a of the rod-shaped connection devices 17 and 18 is equal to the thickness of the flange 38. When the shifting barrel 35 moves back and forth in parallel with the optical axes PR and PL, the connection devices 17 and 18 also move without play at the rotational shaft portions 17a and 22a.

The transmission gear 39 cooperates for the diopter adjustment with the second rod-shaped connection device 18 and the diopter adjusting gear 23 by moving the focus lens 9L on the optical axis PL. The transmission gear 39 is supported and kept rotatable on the cover panel 25. A size of the transmission gear 39 is long in a moving direction of the diopter adjusting gear 23, and kept in mesh with the diopter adjusting gear 23.

The operation barrel 11 is constituted by a barrel body 41 and a barrel cover 42 of resin for covering the barrel body 41. A middle sleeve portion 43 is formed to project from an end of the barrel body 41. This is a double barrel structure. The sleeve portion 43 is inserted between the shaft portion 14d and the intermediate barrel 32 to support the operation barrel 11 on the support shaft 10. The operation barrel 11 is kept rotatable about the support shaft 10 and also movable back and forth along the same.

A plurality of click balls 44a are incorporated in the shaft portion 14d. A spring 44b biases the click balls 44a in a radial direction so as to protrude portions of the click balls 44a. Also, a first engageable groove 43a and a second engageable groove 43b are formed in the inner surface of the sleeve portion 43 in shapes of rings. When the operation barrel 11 is in the focus adjusting position, the click balls 44a are engaged with the first engageable groove 43a. When the operation barrel 11 is in the diopter adjusting position, the click balls 44a are engaged with the second engageable groove 43b.

When the operation barrel 11 is slid from one of the focus adjusting position and diopter adjusting position to a second one of those, the click balls 44a are pressed to the inside of the shaft portion 14d against the spring 44b, to allow smooth slide of the operation barrel 11. The click balls 44a operate for facilitating setting of the operation barrel 11 in one of the focus adjusting position and diopter adjusting position, and also for preventing dropping of the operation barrel 11 from the support shaft 10.

The inside of the barrel body 41 includes a first internal gear 46 for focus adjustment and a second internal gear 47 for diopter adjustment. A changeover mechanism is constituted by the internal gears 46 and 47. When the operation barrel 11 is in the focus adjusting position, rotation of the operation barrel 11 is transmitted to the focus adjuster. When the operation barrel 11 is in the diopter adjusting position, rotation of the operation barrel 11 is transmitted to the diopter adjuster. The first internal gear 46 is positioned at a rear end of the barrel body 41 and is farther from the end opening 11a. The second internal gear 47 is positioned at a front end of the barrel body 41 and is nearer to the end opening 11a.

When the operation barrel 11 is in the focus adjusting position, the first internal gear 46 is meshed with the focus adjusting gear 33 as illustrated in FIG. 4. The transmission gear 39 is free from the second internal gear 47. Also, rotation of the operation barrel 11 is transmitted only to the transmission wheel 31 to move the focus lenses 9R and 9L equally on the optical axes PR and PL.

When the operation barrel 11 is in the diopter adjusting position, the second internal gear 47 is meshed with the transmission gear 39 as illustrated in FIG. 5. The focus adjusting gear 33 is free from the first internal gear 46. Thus, rotation of the operation barrel 11 is transmitted only to the transmission gear 39. The transmission gear 39 rotates and causes the diopter adjusting gear 23 to rotate the intermediate rod 22, which moves the focus lens 9L.

The operation of the binoculars 2 is described now. For focusing, the operation barrel 11 is in the focus adjusting position. If the operation barrel 11 is initially in the diopter adjusting position, the operation barrel 11 is manually pushed forwards to the focus adjusting position. In FIG. 4, the first internal gear 46 comes in mesh with the focus adjusting gear 33. The transmission gear 39 is free from the second internal gear 47 because of the focus adjusting position.

When the operation barrel 11 in the focus adjusting position is rotated in one of the two rotational directions, the focus adjusting gear 33 rotates in mesh with the first internal gear 46. Thus, the transmission wheel 31 rotates. Although the shifting barrel 35 is engaged with the intermediate barrel 32, the shifting barrel 35 is prevented from rotating about the support shaft 10 by the engagement with the second rod-shaped connection device 18. Rotation of the intermediate barrel 32 causes the shifting barrel 35 to move rectilinearly back or forth according to the rotational direction. At this time, the transmission gear 39 is free from the second internal gear 47. The diopter adjusting gear 23 in mesh with the transmission gear 39 does not rotate, and does not change the rod length of the second connection device 18.

As the rod-shaped connection devices 17 and 18 are engaged with the flange 38 of the shifting barrel 35, movement of the shifting barrel 35 causes the connection devices 17 and 18 to move simultaneously, in the same direction and equally in parallel with the optical axes PR and PL. The focus lenses 9R and 9L move to effect the focus adjustment in compliance with rotation of the operation barrel 11.

To adjust the diopter, the operation barrel 11 is slid from the focus adjusting position to the diopter adjusting position backwards toward the ocular side. In FIG. 5, the focus adjusting gear 33 becomes disengaged and free from the first internal gear 46 in the operation barrel 11. The transmission gear 39 comes in mesh with the second internal gear 47.

When the operation barrel 11 in the diopter adjusting position is rotated in one of the two rotational directions, the transmission gear 39 is caused to rotate by the second internal gear 47, so that the diopter adjusting gear 23 rotates. After the focus adjustment, the diopter adjusting gear 23 moves together with the second rod-shaped connection device 18 in parallel with the optical axis PR. However, the transmission gear 39 has a sufficiently long size as viewed in parallel with the optical axis PR. The diopter adjusting gear 23 is always kept in mesh with the transmission gear 39. The focus adjusting gear 33 does not rotate in rotation of the operation barrel 11, because disengaged from the first internal gear 46.

When the diopter adjusting gear 23 rotates, the intermediate rod 22 rotates relative to the lens holder rod 21. As the male thread 21a of the lens holder rod 21 is helically engaged with the female thread 22b of the intermediate rod 22, rotation of the intermediate rod 22 elongates or shortens the second rod-shaped connection device 18 according to one of two rotational directions of the operation barrel 11. When the operation barrel 11 is in the diopter adjusting position, then the flange 38 does not move, as one end of the second connection device 18 is engaged with the flange 38. When the second connection device 18 is made longer or shorter by rotation of the operation barrel 11, the focus lens 9L moves back or forth on the optical axis PL.

As a result, rotation of the operation barrel 11 in the diopter adjusting position can move the focus lens 9L on the optical axis PL without moving the focus lens 9R. This is effective in the diopter adjustment in a suitable manner.

Therefore, the operation barrel 11 as single element in the binoculars 2 is used for the focus adjustment and diopter adjustment by shifting in the optical axis direction for changeover. The operation barrel 11 is rotated for any of those adjustments. Thus, it is possible to reduce the total number of parts for the purpose of the focus and diopter adjustment. Also, erroneous diopter adjustment can be prevented in the course of focusing in the normal use, because the operation barrel 11 must be set in the focus adjusting position distinct from the diopter adjusting position.

Various modifications are possible in the structure of the embodiment of the binoculars according to the invention. For example, connection arms of a swingable form may be used in place of the rod-shaped connection devices 17 and 18. The bridge 4 may be a double joint bridge in place of the single joint bridge. Also, the operation barrel 11 can be disposed on the objective side or in front of the bridge 4.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. Binoculars including first and second lens barrels, a bridge for interconnecting said first and second lens barrels, and first and second optical systems accommodated in respectively said first and second lens barrels, said binoculars comprising:

first and second focus lenses, included in respectively said first and second optical systems, and movable in an optical axis direction;

an operation device, secured to said bridge, movable in said optical axis direction between a focus adjusting position and a diopter adjusting position, and rotatable in each of said focus adjusting position and said diopter adjusting position;

a focus adjuster for moving said first and second focus lenses simultaneously in said optical axis direction for focus adjustment when said operation device is rotated in said focus adjusting position; and a diopter adjuster for moving said second focus lens in said optical axis direction for diopter adjustment when said operation device is rotated in said diopter adjusting position, wherein said operation device includes:

a double barrel structure having a barrel body and a middle sleeve portion, said barrel body being operated externally for focus adjustment and diopter adjustment, said middle sleeve portion receiving insertion of a support shaft of said bridge in a rotatable and movable manner;

a first gear, formed inside said barrel body, for transmitting rotation of said double barrel structure to said focus adjuster when said double barrel structure is set in said focus adjusting position; and a second gear, formed inside said barrel body, offset from said first gear with an interval, for transmitting rotation of said double barrel structure to said diopter adjuster when said double barrel structure is set in said diopter adjusting position.

2. Binoculars as defined in claim 1, further comprising a changeover mechanism for connecting said operation device to one of said focus adjuster and said diopter adjuster selectively;

wherein said changeover mechanism transmits rotation of said operation device to said focus adjuster when said operation device is in said focus adjusting position, and transmits rotation of said operation device to said diopter adjuster when said operation device is in said diopter adjusting position.

3. Binoculars as defined in claim 1, wherein said focus adjuster includes:

a sleeve-shaped transmission wheel for receiving insertion of said middle sleeve portion rotatably, having a male thread and a focus adjusting gear, said male thread being formed with an outer wheel surface, said focus adjusting gear being engageable with said first gear in mesh;

a movable ring, helically engaged with said male thread, for moving in said optical axis direction when said sleeve-shaped transmission wheel is rotated by said double barrel structure;

first and second lens holders for supporting respectively said first and second focus lenses;

a first connection device for connecting said first lens holder with said movable ring, and for moving said first lens holder in said optical axis direction upon movement of said movable ring; and a second connection device for connecting said second lens holder with said movable ring, for moving said second lens holder in said optical axis direction upon movement of said movable ring, and for elongating and shortening in said optical axis direction upon rotating.

4. Binoculars as defined in claim 3, wherein said diopter adjuster includes:

a transmission gear engageable with said second gear in mesh; and a diopter adjusting gear, meshed with said transmission gear, secured to said second connection device, for rotating to elongate or shorten said second connection device, so as to move said second focus lens in said optical axis direction.

5. Binoculars as defined in claim 4, wherein said transmission gear is disposed to extend in said optical axis direction for maintaining a meshed state irrespective of movement of said diopter adjusting gear in said optical axis direction during focus adjustment.

6. Binoculars as defined in claim 5, wherein said second connection device includes:

a lens holder rod secured to said second lens holder fixedly; and a rotatable intermediate rod helically engaged with said lens holder rod, and having said diopter adjusting gear secured thereto.

7. Binoculars as defined in claim 6, further comprising a retention mechanism for positioning and retaining said operation device in said focus adjusting position or said diopter adjusting position.

8. Binoculars as defined in claim 7, wherein said operation barrel is located on an ocular side from said bridge.

9. Binoculars as defined in claim 8, wherein said diopter adjusting position is located on an ocular side from said focus adjusting position.

10. Binoculars as defined in claim 9, wherein said support shaft of said bridge supports said first and second lens barrels rotatably for interpupillary distance adjustment.

* * * * *